(12) United States Patent
Reed et al.

(10) Patent No.: US 8,971,220 B2
(45) Date of Patent: Mar. 3, 2015

(54) DUAL MODE BASE STATION

(75) Inventors: Christopher Reed, Hitchin (GB); Simon Gale, Bishops Stortford (GB); Andrew Urquhart, Bishops Stortford (GB)

(73) Assignee: Rockstar Consortium US LP, Plano, TX (US)

( * ) Notice: Subject to any disclaimer, the term of this patent is extended or adjusted under 35 U.S.C. 154(b) by 763 days.

(21) Appl. No.: 12/958,470

(22) Filed: Dec. 2, 2010

(65) Prior Publication Data

US 2012/0140682 A1    Jun. 7, 2012

(51) Int. Cl.
*H04B 7/00* (2006.01)
*H04J 3/00* (2006.01)
*H04J 1/00* (2006.01)
*H04B 1/44* (2006.01)
*H04B 1/52* (2006.01)

(52) U.S. Cl.
CPC ... *H04B 1/44* (2013.01); *H04B 1/52* (2013.01)
USPC ........... 370/277; 370/280; 370/281; 370/344; 370/347; 370/386; 455/74; 455/78

(58) Field of Classification Search
USPC .......................... 370/277, 278, 280, 281, 478
See application file for complete search history.

(56) References Cited

U.S. PATENT DOCUMENTS

| | | | | |
|---|---|---|---|---|
| 5,475,677 A * | 12/1995 | Arnold et al. | ................. | 370/280 |
| 5,881,369 A * | 3/1999 | Dean et al. | ...................... | 455/78 |
| 6,130,897 A * | 10/2000 | Ishida et al. | .................. | 370/478 |
| 2005/0277436 A1* | 12/2005 | Lai et al. | .................... | 455/552.1 |
| 2008/0107093 A1* | 5/2008 | Meiyappan et al. | .......... | 370/339 |
| 2010/0118744 A1* | 5/2010 | Kwon et al. | .................. | 370/278 |
| 2010/0202325 A1* | 8/2010 | Poulin et al. | .................. | 370/280 |
| 2010/0246475 A1* | 9/2010 | Naden et al. | .................. | 370/315 |
| 2010/0265852 A1* | 10/2010 | Tikka et al. | .................. | 370/278 |
| 2011/0075593 A1* | 3/2011 | Chen et al. | .................... | 370/280 |

* cited by examiner

*Primary Examiner* — Yemane Mesfin
*Assistant Examiner* — Peter Chen
(74) *Attorney, Agent, or Firm* — Barnes & Thornburg LLP (57) ABSTRACT

A base station including at least a transceiver switch is provided enabling the base station to transmit and receive data in either FDD or TDD mode from an antenna. The base station may be provided with a synthesizer which can be retuned from FDD to TDD mode or alternatively, an FDD and a TDD synthesizer and a switch enabling the transmitter and receiver of the base station to process FDD or TDD mode data respectively.

13 Claims, 8 Drawing Sheets

DUAL MODE BASE STATION

FIELD OF THE INVENTION

This invention relates to apparatus able to transmit and receive both in FDD mode and TDD mode and a method of enabling an apparatus able to transmit and receive both in FDD mode and TDD mode. The invention is applicable to use within a base station in a wireless network. The invention is particularly applicable to implement in-band backhaul in a wireless network containing such a base station.

BACKGROUND OF THE INVENTION

Mobile telephony systems, include user equipment, such as mobile handsets, have undergone rapid development through a number of generations. In the mobile telephony system the user equipment communicates via wireless links to a network of base stations connected to a telecommunications network. The initial deployment of mobile telephony systems, using analogue modulation for communication, was superseded by second generation digital systems, which are themselves currently being superseded by third generation digital systems such as UMTS and CDMA. Third generation standards provide for a greater throughput of data than is provided by second generation systems; this trend is continued with the proposal by the Third Generation Partnership Project of the so-called Long Term Evolution system, often simply called LTE, which offers potentially greater capacity still, by the use of wider frequency bands, spectrally efficient modulation techniques and, potentially, the exploitation of spatially diverse propagation paths to increase capacity (Multiple In Multiple Out).

Distinct from mobile telephony systems, wireless data access systems have also undergone development. Wireless data access systems were initially aimed at providing the "last mile" (or thereabouts) connection between user equipment at a subscriber's premises and the public switched telephone network (PSTN); the user equipment, typically, being a terminal to which a telephone or computer is connected. The WiMax standard (IEEE 802.16) has provided a means for such terminals to connect to the PSTN via high data rate wireless access systems.

Whilst WiMax and LTE have evolved via different routes, both can be characterised as high capacity wireless data systems that serve a similar purpose, typically using similar technology, and in addition both are deployed in a cellular layout as cellular wireless systems. Typically such cellular wireless systems comprise user equipment such as mobile telephony handsets or wireless terminals, a number of base stations, each potentially communicating over what are termed access links with many user equipments located in a coverage area known as a cell, and a two way connection, known as backhaul, between each base station and a telecommunications network such as the PSTN.

As the data capacity of cellular wireless systems increases, an increased demand is placed on the capacity of the backhaul, the connection that has to convey the wireless-originating traffic to its destination, often in an entirely different network. For earlier generations of cellular wireless systems, the backhaul has been provided by one or more connections leased from another telecommunications operator (where such a connection exists near to the base station). However, increasing data rates increases the number of leased lines required to convey the data. Consequently, the operational expense associated with adopting multiple leased lines has also increased, making this a potentially expensive option for high capacity systems. As an alternative to leased lines, dedicated backhaul links can be provided by a variety of methods including microwave links or optical fibre links. However each of these methods of backhaul has associated costs. Dedicated fibre links can be expensive in terms of capital expense due mainly to the cost of the civil works in installation, and this problem is especially acute in urban areas. Microwave links also involve the capital expense of equipment and require expert installation due to narrow beam widths leading to the requirement for precise alignment of antennas.

As an alternative to the provision of a dedicated backhaul link for each individual base station, it is possible to use the radio resource of the cellular wireless system to relay backhaul traffic from one base station to another. Typically, the base station using the cellular radio resource for backhaul is a small low power base station with an omnidirectional antenna known as a relay node. Such a system can be used to extend the area of cellular wireless coverage beyond the area of coverage of conventional base stations that are already equipped with a dedicated backhaul.

Figure 1:
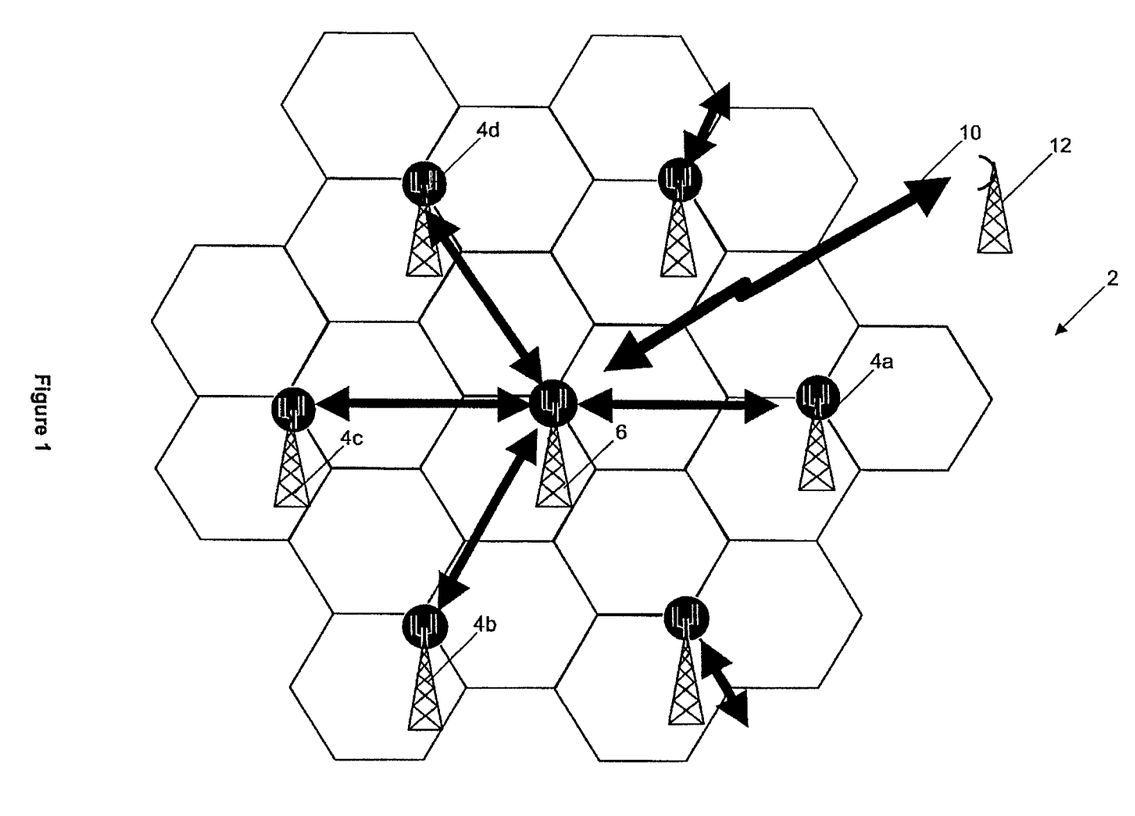
FIG. 1 illustrates a cellular wireless network.

FIG. 1 illustrates a conventional in-band wireless cellular network 2; in this instance, base stations, or relays, 4a-4d are connected, through wireless channels, to an aggregation node 6. The aggregation node 6 also acts as a base station for user terminals and is included in the same cellular planning layout as the base stations 4. The aggregation node 6 is connected, for example by a microwave or fibre link 10, to a gateway 12. The gateway 12 is then, in turn, connected to a telecommunications network (not shown) again, possibly also by using wireless channels. This architecture re-uses the radio equipment and spectrum allocation already provided for data links to users, also to provide the backhaul communication between a group of base stations.

It is usual for the channels connecting the base stations 4a-4d to the user equipment terminals and connecting the aggregation node 6 to the user equipment terminals to be provided using either a Time Division Duplexing (TDD) or a Frequency Division Duplexing (FDD) system. Often different operators within the same coverage area will have one, or both, systems available to user equipment connecting via one of the base stations 4 or 6.

In TDD, each channel having a predetermined frequency range is divided into a number of time frames; each frame being subdivided into a plurality of timeslots. Some of the timeslots in each frame are designated for uplinking and some are designated for downlinking, with each piece of user equipment being allocated particular uplink and downlink timeslots for a particular communication session. Of course, different operators will, in general, have different frequency channels allocated to them.

In FDD, two bands of frequencies are available as communication channels, one for uplink (meaning a data link from the user terminal to the base station) and the other for downlink (meaning a data link from the base station to the user terminal). For a particular communication session with user equipment, the operator will allocate a number of frequency channels from the uplink band as an uplink channel and a number of frequency channels from the downlink band as a downlink channel to that user equipment. The user equipment will then transmit and receive data using those particular frequency channels for the duration of a communication session. Different pieces of user equipment may share the same uplink and downlink channels by being assigned different spreading codes or OFDM sub-carriers to allow their data transmissions to be distinguished.

Conventionally, a base station and aggregation node in a wireless network will either operate TDD mode or FDD mode. This limits the ability of the base stations to serve user equipment supported by different operators. It also restricts the use of in-band backhaul within the network.

SUMMARY OF THE INVENTION

According to a first aspect of the invention there is provided apparatus comprising:
(i) an input, for example, as an incoming signal from the base station antenna
(ii) an output, for example, as an outgoing signal to the base station antenna
(iii) a transmit processor to process data for transmission by the output,
(iv) a receive processor to process data received by the input,
(v) a duplexer connected to the input and output and including a first port and a second port, the duplexer configured to pass data received in a first frequency band between one of the input and output and the first port and data received in a second frequency band between one of the input and output and the second port;
(vi) a transceiver switch connected to the transmit processor, receive processor, first port and second port; to switchably connect one of the transmit processor and receive processor to one of the first port and second port.

By selectively connecting the transmit and receive processors to the ports in the duplexer the apparatus can allow data to be sent and received either in the same time slots (when the apparatus is enabling a base station to operate in FDD mode) or in different time slots (when the apparatus is enabling a base station to operate in TDD mode).

The transceiver switch may connect the transmit processor to the second port and switchably connects the receive processor to either the first port or the second port such that the receive processor can process data received either in the first set of frequencies or the second set of frequencies. This enables the receive processor to either process data received at the same time that data is transmitted (when the base station is operating in FDD mode) or only process data received in time slots associated with receiving data (when the base station is operating in TDD mode).

Data passed from at least one of the first port and second port to the receive processor may be amplified before it is passed to the receive processor. This arrangement is advantageous, as it avoids a degradation in receiver sensitivity due to the impact of signal loss through the additional components added according to this invention.

The transceiver switch may include a circulator connected to the second port and configured to alternately transmit data to a pathway connecting the second port and the transmit processor and another pathway connecting the second port and the receive processor. This arrangement is advantageous because the use of a circulator is particularly suited to operation in high power base station applications, having high reliability and low signal attenuation. The use of a circulator is preferable to a high power RF switch which would be expensive using current technologies and likely to degrade the overall system performance by introducing loss to the transmitted signal.

Optionally, the transceiver switch may connect the receive processor to the first port and switchably connect the transmit processor to either the first port or the second port such that it can pass data to be transmitted either in a first set of frequencies or a second set of frequencies. This enables the transmit processor to either cause data to be transmitted at the same time that data is received (when the base station is operating in FDD mode) or only cause data to be transmitted in time slots associated with transmitting data (when the base station is operating in TDD mode).

Data passed from the transmit processor to the first port or second port is amplified before it is passed to the first or second port.

The transceiver switch may include a circulator connected to the first port and configured to alternately transmit data to the first port from a pathway connecting the first port and the transmit processor and another pathway connecting the first port and the receive processor.

Preferably, the apparatus further comprises:
(i) a first frequency synthesiser;
(ii) a second frequency synthesiser;
(iii) a synthesiser switch connected to the transmit processor, receive processor, first frequency synthesiser and second frequency synthesiser; to switchably connect one of the transmit processor and receive processor to one of the first frequency synthesiser and second frequency synthesiser.

The synthesiser switch may connect the transmit processor to the first frequency synthesiser and switchably connect the receive processor to either the first frequency synthesiser or the second frequency synthesiser such that the receive processor can process data received either in a first frequency or a second frequency. This means that the transmit and receive processor may both operate at the same frequency (when operating in TDD mode) or at different frequencies (when operating in FDD mode).

The synthesiser switch preferably includes a splitter between in the pathway between the first frequency synthesiser and the transmit and receive processors such that the first frequency synthesiser can supply data to both the transmit and the receive processors when the synthesiser switch is in a first configuration and only the transmit processor when the synthesiser switch is in a second configuration. This allows a single synthesiser to drive both the transmit and receive processors simultaneously for TDD operation.

Alternatively, the synthesiser switch may connect the receive processor to the first frequency synthesiser and switchably connects the transmit processor to either the first frequency synthesiser or the second frequency synthesiser such that the transmit processor can process data to be transmitted either in a first frequency or a second frequency. This means that the transmit and receive processor may both operate at the same frequency (when operating in TDD mode) or at different frequencies (when operating in FDD mode).

The synthesiser switch preferably includes a splitter between the pathway between the first frequency synthesiser and the transmit and receive processors such that the first frequency synthesiser can supply a local oscillator to both the transmit and the receive processors when the synthesiser switch is in a first configuration and only the receive processor when the synthesiser switch is in a second configuration. This allows a single synthesiser to drive both the transmit and receive processors simultaneously.

The apparatus may alternatively, comprise a single frequency synthesiser, the frequency synthesiser being retunable between two or more frequencies. This enables the transmit and receive circuits to operate at different frequencies but be driven by the same synthesiser.

The apparatus may be a base station or may be connectable to a base station to enable a conventional base station to operate in either TDD or FDD mode.

The apparatus may also be an aggregation node or may be connectable to an aggregation node to operate in either TDD or FDD mode.

The apparatus is utilised at the base stations 4 or the aggregation node 6 as shown in FIG. 1. The data transmitted from base station 4 to the aggregation node 6 represents a backhaul uplink, and the data transmitted from aggregation node 6 to base stations 4 represents a backhaul downlink. The apparatus described is applied at both nodes, with the TDD timeslots selected at either end of the link so as to allow for both link directions to be transmitted in the same frequency band.

According to another aspect of the present invention there is provided a telecommunications network including apparatus as recited in any of the above paragraphs.

BRIEF DESCRIPTION OF THE DRAWINGS

As will be understood by one skilled in the art, other aspects and features of the present invention will become apparent to those ordinarily skilled in the art upon review of the following description of specific embodiments of the invention in conjunction with the accompanying figures.

DETAILED DESCRIPTION OF PREFERRED EMBODIMENTS

Figure 2:
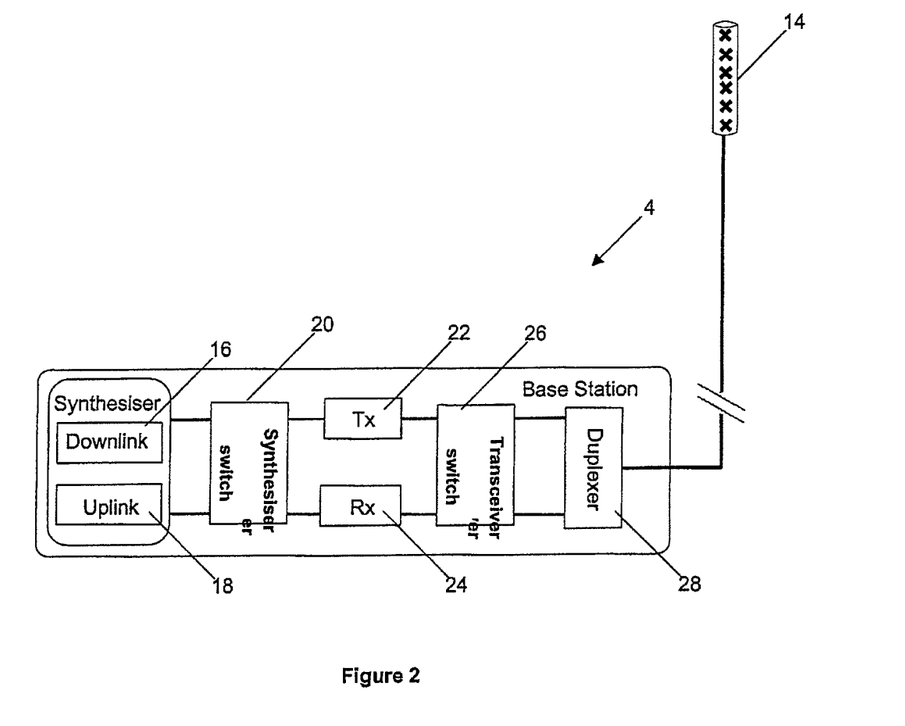
FIG. 2 illustrates a base station in accordance with the present invention.

FIG. 2 illustrates a base station 4 which is enabled to function to selectively use both FDD and TDD modes to transmit and receive data. The base station 4 includes an antenna 14 for receiving and transmitting data. The base station 4 also includes a downlink synthesiser 16 and an uplink synthesiser 18, the downlink synthesiser 16 being tuned to a downlink frequency and the uplink synthesiser 18 being tuned to an uplink frequency. In base station equipment with an intermediate frequency architecture, the synthesizer frequencies are those which correspond with radio outputs in the desired bands, and the synthesizer outputs may include frequency offsets according to the frequency conversion design of the base station.

A synthesiser switch 20 is provided enabling the downlink synthesiser 16 to be connected to either the transmitter circuit 22 or the receiver circuit 24 and the uplink synthesiser 18 to be connected to the transmitter circuit 22 or the receiver circuit 24. Thus, the base station 4 can both transmit and receive in either the band of frequencies conventionally assigned to data uplink or the band of frequencies conventionally assigned for data downlink.

Further, there is provided a transceiver switch 26 which enables the transmitter 22 to be connected to either the uplink or the downlink port (not shown) of a duplexer 28 in the base station 4 and the receiver 24 to be connected to either the uplink or the downlink port of the duplexer 28.

The duplexer 28 is configured to pass data received at the uplink port to the antenna 14 for transmission in the uplink frequency band, and pass data received at the antenna 14 in the uplink frequency band to the uplink port. Additionally, the duplexer 28 is also configured to pass data to the antenna 14 for transmission in the downlink frequency band and pass data, received at the antenna 14 in the downlink frequency band to the downlink port. By selectively connecting the transmitter circuit 22 or the receiver circuit 24 to the relevant port the transceiver switch 26 allows the base station 4 to receive data or transmit data in either uplink or downlink frequency band.

Figure 3:
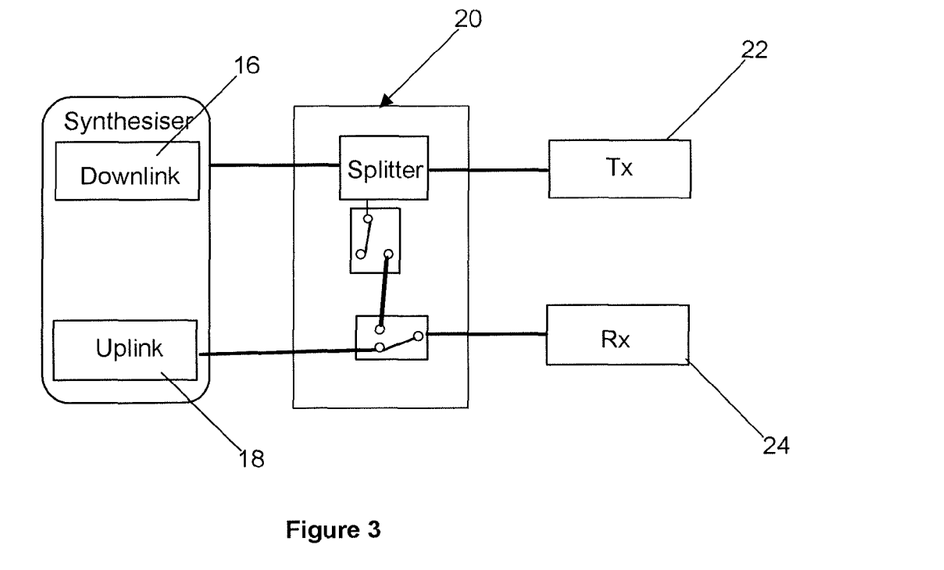
FIGS. 3 and 4 illustrate alternative states of the synthesiser switch of the first embodiment.
Figure 4:
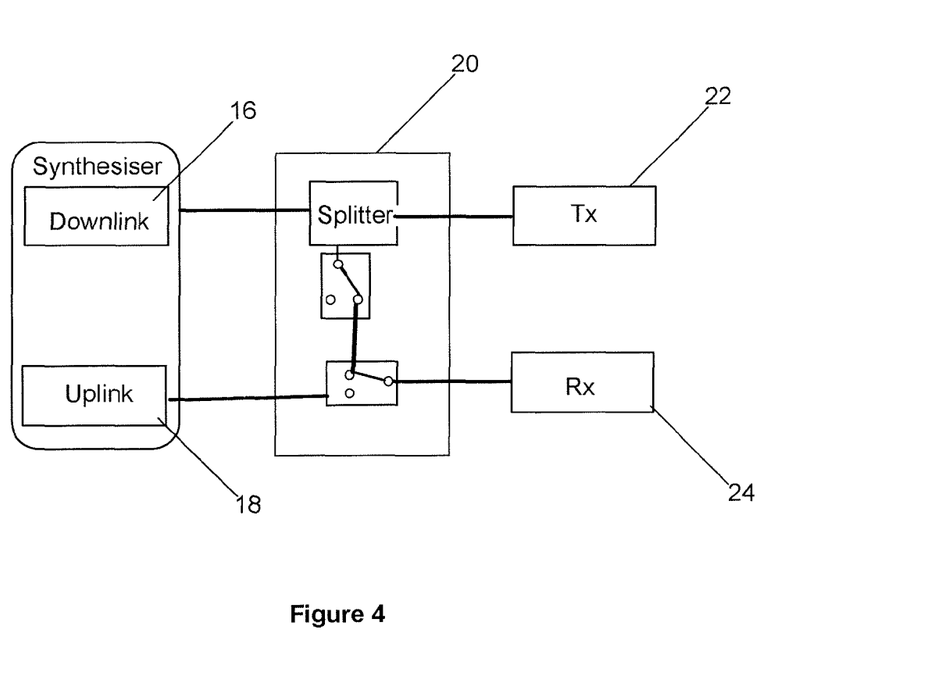

A first embodiment of the invention will now be explained in more detail with reference to FIGS. 3 and 4.

In this embodiment the in-band backhaul in the base station operates in TDD mode using the downlink band of frequencies when transmitting to the aggregation node and receiving data from the aggregation node. The base station operates in FDD mode when transmitting data to the downlink and receiving data from the uplink user equipment The receiver circuit 24 in the base station must therefore be able to process data received on the uplink frequency to process data received from user equipment, and be able to process data received on the downlink frequency to process data received from the aggregation node. As discussed previously, conventionally, received data is only processed by a base station in an FDD system when it is received in uplink frequencies or by a base station in a TDD system when it is received in an uplink timeslot. In order to achieve the additional flexibility the base station of the present invention is provided with a synthesiser switch 20 as illustrated in FIG. 3.

Considering the synthesiser switch configuration when the base station is operating in FDD mode the synthesiser switch is used to select which synthesiser is feeding data to the receiver circuit 24. When the base station is operating in FDD mode the receiver circuit 24 is fed by the uplink synthesiser 18 as illustrated in FIG. 3. In FIG. 3 it can be seen that the uplink synthesiser 18, which operates when data is received in an FDD mode is connected to the receiver circuit 24 via the switch 20. Additionally, the downlink synthesiser 16 is connected to the transmitter circuit 22 via a splitter in the switch. Thus, the downlink synthesiser 16 permanently feeds data to the transmitter circuit 22; however, the switch acts to prevent a connection between the downlink synthesiser 16 and the receiver circuit 24 when the base station is operating in FDD mode. Hence, in this configuration the transmitter circuit 22 and the receiver circuit 24 operate at different frequencies and the base station can operate in FDD mode.

Conversely, if the base station is to operate in TDD mode, both the transmitter and the receiver circuit 22, 24 operate at the same frequency and, thus, are connected to the same synthesiser. To achieve this the switch 20 converts to the configuration illustrated in FIG. 4. In FIG. 4 it can be seen that the transmitter and receiver circuits 22, 24 are both connected to, and therefore, driven using the downlink synthesiser 16 and thus, operate on the same frequency. To achieve this the switch 20 breaks the connection between the receiver circuit 24 and the uplink synthesiser 18 and connects the output of the splitter in the switch 20 to the receiver circuit 20. Thus, both the transmitter and receiver circuits 22, 24 are fed by the downlink synthesiser and the base station can operate in TDD mode.

Advantageously, this switched arrangement allows both synthesizers to remain locked to the same frequency at all times, such that the frequency outputs are stable. This also avoids degradations of the synthesizer phase noise that would occur due to signal cross-coupling if the synthesizer connected to the receiver were to re-tune to the downlink frequency band.

In a conventional TDD base station duplexing is performed by switches and/or circulators. The duplexor 28 can be replaced by a single frequency band filter.

Figure 5:
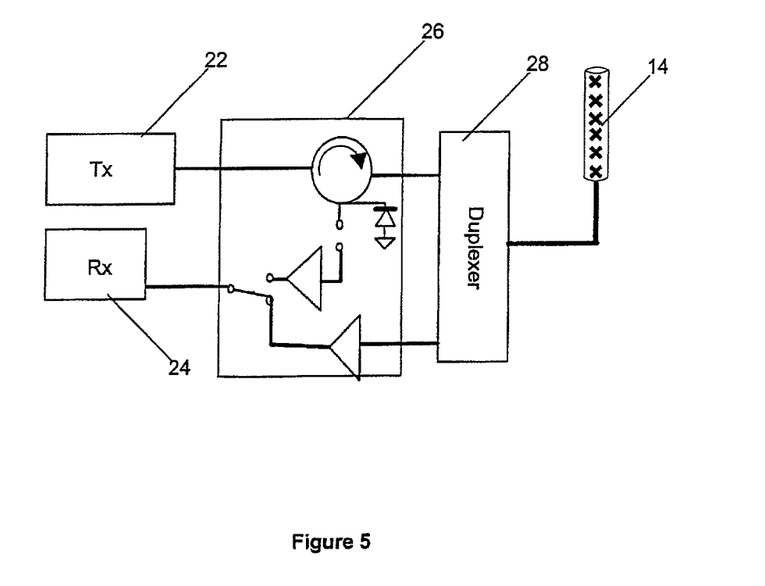
FIGS. 5 and 6 illustrate alternative states of the transceiver switch of the first embodiment.

The base station of the embodiment is configured to act both as an FDD and a TDD base station and, hence, may be able to process data from the aggregation node in downlink frequencies in addition to those received in uplink frequencies. An example of such a switch is the transceiver switch 26 which enables the base station to achieve this is illustrated in FIGS. 5 and 6 and is discussed in more detail below.

The base station will always transmit in downlink frequencies and thus, the transmitting circuit 22 remains connected to the downlink port of the duplexer. To be able to receive data in both uplink and downlink frequencies the receiver circuit 24 is switchably connected either to the uplink port or the downlink port of the duplexer 28.

The duplexer 28 in the base station automatically directs data received in uplink frequencies to the uplink port and data received in downlink frequencies to the downlink port.

Figure 6:
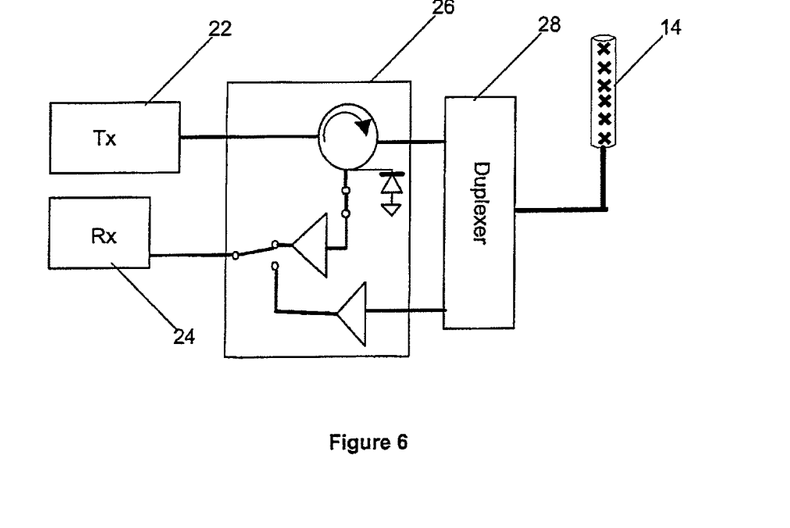
Figure 7:
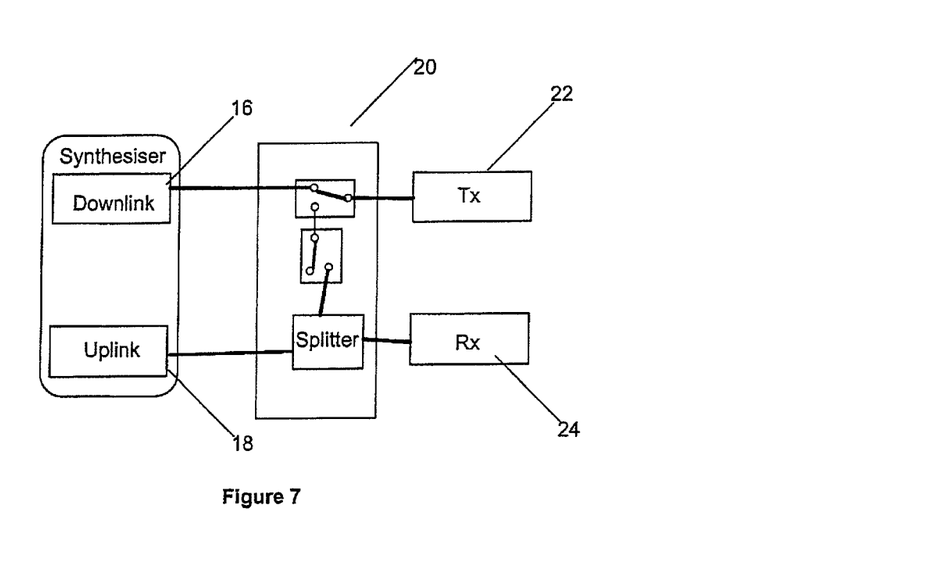
FIGS. 7 and 8 illustrate alternative states of the synthesiser switch of the second embodiment.

FIG. 6 illustrates the base station operating in TDD mode where data received in an uplink frequency is not processed by the base station as it is not passed to the receiver circuit and data received in a downlink frequency is processed by the receiver circuit. In this configuration, data, when received by the antenna 14 is passed to the duplexer 28 which directs the data to its downlink port. In FIG. 6, the downlink port is connected, via the transceiver switch 26, to the receiver circuit 24 thus data received in the downlink frequency band is passed directly to the receiver circuit 24 for processing. Data received in the uplink frequency band is not passed to the receiver circuit and, thus, the base station is acting as a TDD base station.

However, when the base station wishes to act in FDD mode by processing data received in the uplink frequency band the base station causes the transceiver switch 26 to change configuration to that illustrated in FIG. 5. In FIG. 5 the switch arrangement is altered such that the uplink output of the duplexer, to which data in the uplink frequency is sent, is forwarded to the receiver circuit for processing and hence the base station processes data received in uplink frequencies, typically from the user terminal.

Preferably, a circulator is used rather than a traditional switch in the transceiver switch to minimise transmitter loss.

An alternative embodiment is illustrated in FIGS. 7 to 10. In this embodiment the transmitter circuit is selectively connected to the uplink synthesiser and the relevant port of the duplexer such that the in-band backhaul may operate in the uplink frequency band.

As in the first embodiment, there is a synthesiser switch 20; however the synthesiser switch 20 selects the synthesiser driving the transmitter circuit 22 rather than the receiver circuit. In order for the base station to operate in FDD mode the switch takes the configuration illustrated in of FIG. 7. As can be seen the downlink synthesiser 16, is connected to the transmitter circuit 22 and the uplink synthesiser 18 is sent through a splitter with one copy being forwarded to the receiver circuit 24 and the other copy being passed to an internal switching circuit. However, as the internal switching circuit does not connect the uplink synthesiser 18 to the transmitter circuit 22, the receiver and transmitter circuit are fed by different synthesisers and, hence the base station can operate in FDD mode.

Figure 8:
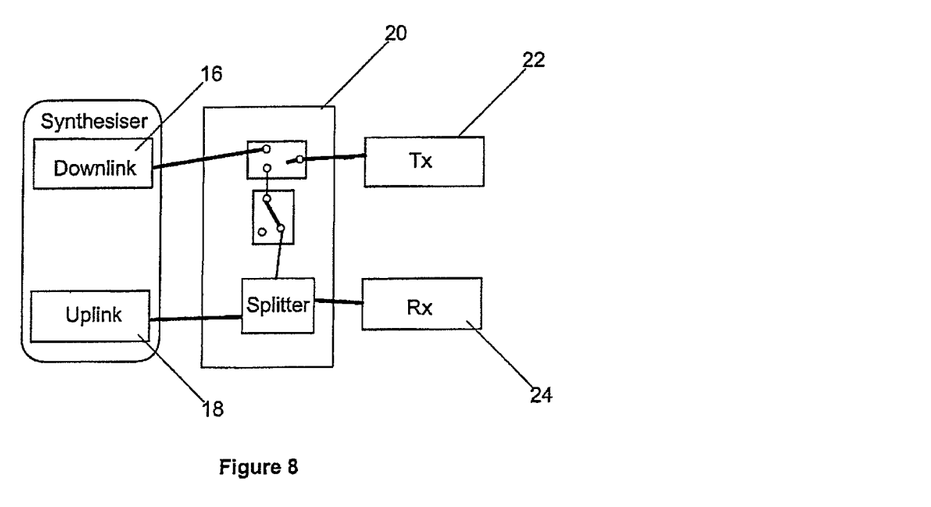

Conversely, if the base station is to operate in TDD mode the switch configuration is altered such that the receiver and transmitter circuit are both fed by the uplink synthesiser as illustrated in FIG. 8. The receiver circuit 24 is consistently fed by the uplink synthesiser 18.

Figure 9:
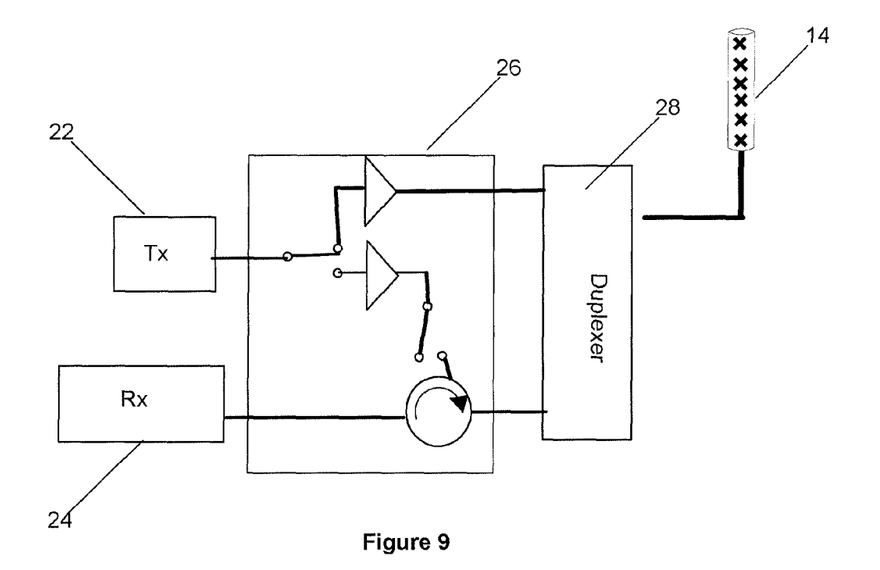
FIGS. 9 and 10 illustrate alternative states of the transceiver switch of the second embodiment.
Figure 10:
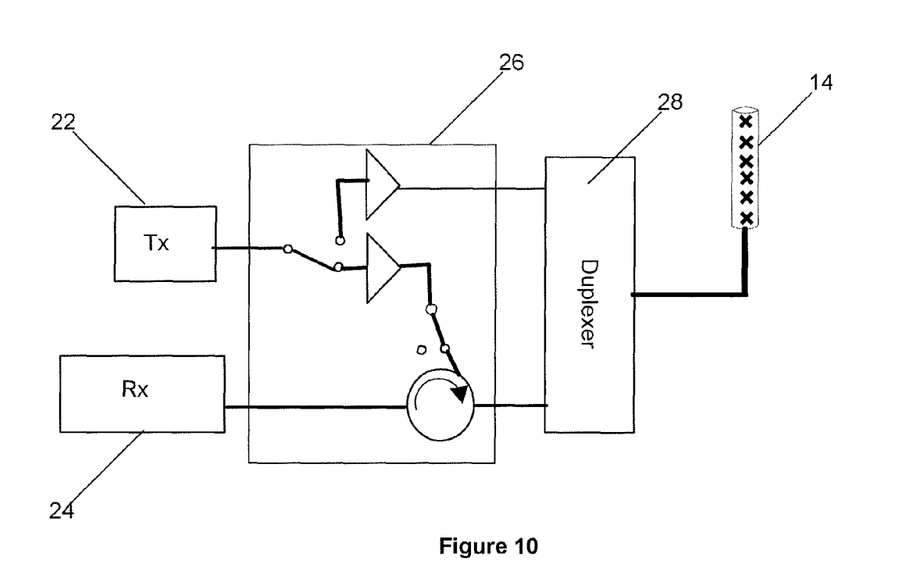

A transceiver changeover switch is also present in the base station, an example of such a switch is illustrated in FIGS. 9 and 10. This switch operates to enable the transmitter circuit 22 to connect to both the uplink and downlink port of the duplexer and thereby transmit in both uplink and downlink frequency bands to enable in-band backhaul.

If data is to be transmitted in downlink frequencies, i.e. to user equipment, and processed by the receiving circuit 24 when received in uplink frequencies then the switch is configured as illustrated in FIG. 9. As can be seen, the switch connects the transmitting circuit 22 to the downlink port of the duplexer 28 thereby enabling the transmission of data on downlink frequencies.

Conversely, if data is to be transmitted to the aggregation node then it will be transmitted in the uplink frequency band. In this instance the switch alters to connect the transmitter circuit 22 to the uplink port of the duplexer 28 as illustrated in FIG. 10. This enables data to be transmitted to the aggregation node using the uplink frequency band thereby enabling in-band backhaul on the uplink frequency band.

Figure 11:
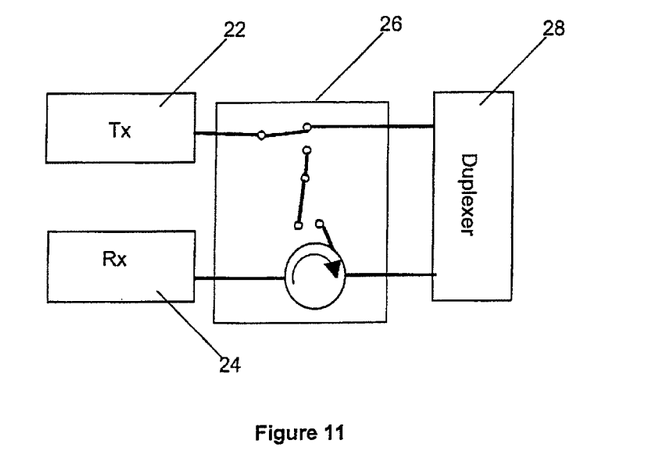
FIGS. 11 and 12 illustrate alternative states of the transceiver switch of another embodiment.
Figure 12:
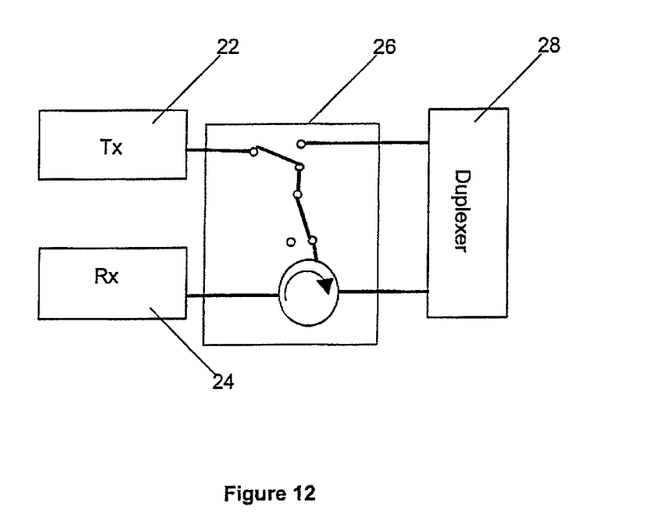

Optionally, the pair of amplifiers shown in FIGS. 11 and 12 may be replaced by a single amplifier on the transmitter side of the switch. This has the disadvantage that the switch is required to operate with high RF power, and also that the power output level is similar for both downlink data to user terminals, and for in-band backhaul data. However, if suitable switch technology is available, or if amplifiers are developed with high agility in output power level, then a single amplifier may be used to reduce cost and complexity.

Optionally, the amplifiers of the transceiver switch may be omitted from the transceiver switch of either the first or second embodiment. An example, of a transceiver switch omitting the amplifiers is illustrated in FIGS. 11 and 12.

Figure 13:
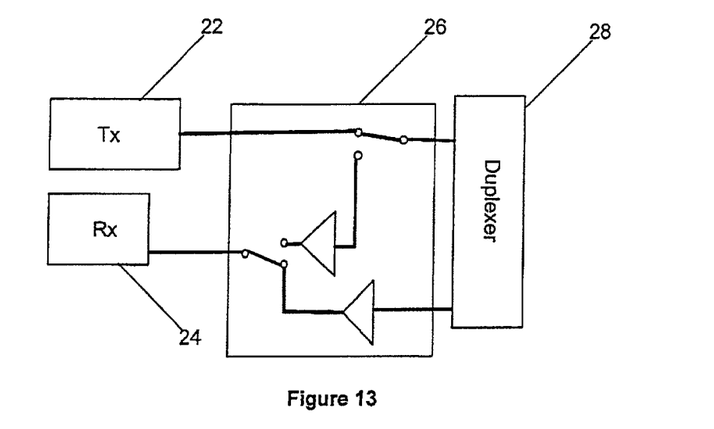
FIGS. 13 and 14 illustrate alternative states of the transceiver switch of a further embodiment.
Figure 14:
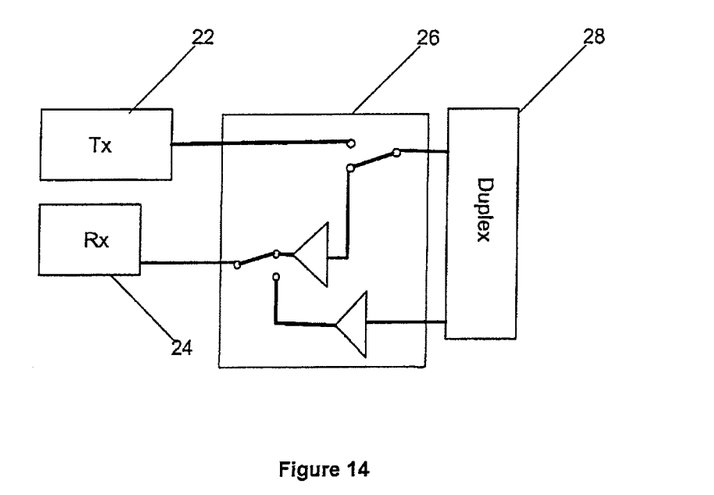

Further, the circulator may be replaced by a conventional switch in the transceiver switch of either the first or second embodiment. An example, of a transceiver switch omitting the amplifiers is illustrated in FIGS. 13 and 14.

If desired the synthesiser switch and synthesisers of either embodiment may be replaced by a single synthesiser which can be retuned between the downlink and uplink frequencies.

Although the present invention has been described in relation to a base station, the invention could also be implemented in a separate device connectable to a base station and configured to receive data from, and transmit data to an antenna, or other component, in a base station.

What is claimed is:

1. Apparatus comprising:
   (i) an input;
   (ii) an output;
   (iii) a transmit processor configured to process data for transmission by the output;
   (iv) a receive processor configured to process data received by the input;
   (v) a duplexer connected to the input and output, and including a first port and a second port, the duplexer being configured to pass data received in a first frequency band between one of the input and output and the first port and data received in a second frequency band between one of the input and output and the second port; and
   (vi) a transceiver switch including a circulator couplable to the transmit processor and the receive processor, and connected to the transmit processor and receive processor, first port and second port, the transceiver switch being configured to connect either the transmit processor to the second port and switchably connect the receive processor between the first port and the second port, or to connect the receive processor to the first port and switchably connect the transmit processor between the first port and the second port.

2. The apparatus claimed in claim 1, wherein data passed from at least one of the first port and second port to the receive processor is amplified before it is passed to the receive processor.

3. The apparatus claimed in claim 1, wherein the circulator is connected to the second port and configured to alternately transmit data to a pathway connecting the second port and the transmit processor and another pathway connecting the second port and the receive processor.

4. The apparatus claimed in claim 1, wherein data passed from the transmit processor to the first port or second port is amplified before it is passed to the first or second port.

5. The apparatus claimed in claim 1, wherein the circulator is connected to the first port and configured to alternately transmit data to the first port from a pathway connecting the first port and the transmit processor and another pathway connecting the first port and the receive processor.

6. The apparatus claimed in claim 1, further comprising:
(vii) a first frequency synthesiser;
(viii) a second frequency synthesiser;
(ix) a synthesiser switch connected to the transmit processor, receive processor, first frequency synthesiser and second frequency synthesiser, the synthesiser switch being configured to switchably connect one of the transmit processor and receive processor to one of the first frequency synthesiser and second frequency synthesiser, and wherein the synthesiser switch includes a splitter in the pathway between the first frequency synthesiser and the transmit and receive processors.

7. The apparatus claimed in claim 6, wherein the synthesiser switch connects the transmit processor to the first frequency synthesiser and switchably connects the receive processor to either the first frequency synthesiser or the second frequency synthesiser such that the receive processor can process data received either in a first frequency band or a second frequency band.

8. The apparatus claimed in claim 7, wherein the splitter is arranged such that the first frequency synthesiser can supply data to both the transmit and the receive processors when the synthesiser switch is in a first configuration and only the transmit processor when the synthesiser switch is in a second configuration.

9. The apparatus claimed in claim 6, wherein the synthesiser switch connects the receive processor to the first frequency synthesiser and switchably connects the transmit processor to either the first frequency synthesiser or the second frequency synthesiser such that the transmit processor can process data to be transmitted either in a first frequency band or a second frequency band.

10. The apparatus claimed in claim 6, wherein the synthesiser switch includes a splitter in the pathway between the first frequency synthesiser and the transmit and receive processors such that the first frequency synthesiser can supply data to both the transmit and the receive processors when the synthesiser switch is in a first configuration and only the receive processor when the synthesiser switch is in a second configuration.

11. The apparatus claimed in claim 1, wherein the apparatus further comprises a frequency synthesiser shared between the transmit and receive processors, the frequency synthesiser being re-tunable between an uplink and a downlink frequency band when the apparatus is operating in a Frequency Division Duplex mode.

12. The apparatus claimed in claim 1, wherein the apparatus is one of the group comprising an aggregation node, and apparatus connectable to an aggregation node.

13. A telecommunications network including apparatus comprising:
(i) an input;
(ii) an output;
(iii) a transmit processor configured to process data for transmission by the output;
(iv) a receive processor configured to process data received by the input;
(v) a duplexer connected to the input and output, and including a first port and a second port, the duplexer being configured to pass data received in a first frequency band between one of the input and output and the first port and data received in a second frequency band between one of the input and output and the second port; and
(vi) a transceiver switch which includes a circulator couplable to the transmit processor and the receive processor, the transceiver switch being connected to the transmit processor, receive processor, first port and second port, the transceiver switch being configured to connect either the transmit processor to the second port and switchably connect the receive processor between the first port and the second port, or to connect the receive processor to the first port and switchably connect the transmit processor between the first port and the second port.

* * * * *